United States Patent [19]
Vollert et al.

[11] Patent Number: 5,093,855
[45] Date of Patent: Mar. 3, 1992

[54] METHOD FOR SPEAKER RECOGNITION IN A TELEPHONE SWITCHING SYSTEM

[75] Inventors: Emmeran Vollert, Grosshoehenrain; Goerg Humpert, Munich, both of Fed. Rep. of Germany

[73] Assignee: Siemens Aktiengesellschaft, Munich, Fed. Rep. of Germany

[21] Appl. No.: 402,495

[22] Filed: Sep. 1, 1989

[30] Foreign Application Priority Data

Sep. 2, 1988 [EP] European Pat. Off. ............ 88114366

[51] Int. Cl.$^5$ .......................... H04J 3/06; H04M 1/60
[52] U.S. Cl. .................................. 379/88; 370/105.2; 370/110.1; 379/388
[58] Field of Search ..................... 379/88, 67, 89, 355, 379/388; 370/62, 110.1, 105.2

[56] References Cited

U.S. PATENT DOCUMENTS

| | | | |
|---|---|---|---|
| 4,592,045 | 5/1986 | Fundneider | 379/280 X |
| 4,763,350 | 8/1988 | Immendorfer et al. | 379/67 |
| 4,864,301 | 9/1989 | Helferich | 347/110 |

OTHER PUBLICATIONS

"ISDN Network Terminating Equipment", J. M. Griffiths, *IEEE Trans. on Commus.*, vol. COM-30, No. 9, Sep. 1982, pp. 2137-2142.

"ISDN Performance Tradeoffs", W. S. Gifford, *IEEE Communications Magazine*, vol. 25, No. 12, Dec. 1987, pp. 25-29.

Primary Examiner—Thomas W. Brown
Attorney, Agent, or Firm—Hill, Van Santen, Steadman & Simpson

[57] ABSTRACT

A method and apparatus for speaker recognition in a telephone switching system. For speaker recognition in, in particular, a system fashioned as an ISDN communications system, speech specimens are input into a telephone terminal equipment (T1, T2) and are pre-processed there, being, in particular, sampled with a sampling rate that is doubled in comparison to the usual sampling rate. The samples are transmitted to a switching system (VA) in the two ISDN data channels (B1, B2) in alternation, the actual speaker recognition (SPR) being carried out in this switching system (VA).

10 Claims, 3 Drawing Sheets

METHOD FOR SPEAKER RECOGNITION IN A TELEPHONE SWITCHING SYSTEM

CROSS REFERENCE TO RELATED APPLICATION

The present application relates to, but is in now way dependent upon co-pending application U.S. Ser. No. 402,054 filed Sept. 1, 1989 and assigned to the same Assignee as the present application.

BACKGROUND OF THE INVENTION

The present invention is directed to a method for speaker recognition in a telephone switching system, wherein speech specimens are input into telephone terminal equipment connected to the telephone switching system and are supplied to the switching system within the framework of a speaker recognition test. The speech specimens are sampled with a prescribed, first frequency, and the samples formed are supplied to a means arranged in the switching system that, by comparing reference speech specimens originally deposited in the switching system and speech specimens input within the framework of the speaker recognition test, forms a first signal that identifies a recognition of the speaker or forms a second signal that indicates that recognition of the speaker has not occurred.

AT & T Technical Journal, September/October 1986, Volume 65, Issue 5, pp. 68–74 discloses a system referred to as "A Voice Password System for Access Security" and discloses a method for speaker verification. The system is connected to a telephone network and is composed of what is referred to as a speech verification unit, a computer and an operations-oriented means. Within the framework of a verification test, speakers to be verified must input an identification number into telephone terminal equipment connected to the system and must speak a sentence composed of a plurality of passwords (password phrase). The speech specimens are transmitted via the telephone network and are supplied to the speech verification unit. Auto-correlation coefficients are first calculated for the signals arriving there. Following thereupon, these auto-correlation coefficients are converted into LPC (linear predictive coding) coefficients. These are in turn modified according to the Cepstrum technique. The modified coefficients are finally subjected to a further procedure (channel normalization). Although the implementation of the various procedures leads to lower error rates, it also requires a considerable outlay for eliminating disturbing influences that derive due to the transmission of the speech specimens over the telephone network.

SUMMARY OF THE INVENTION

An object of the present invention is to provide a method of the type initially cited that reduces the computational requirement for the speaker recognition.

This object is inventively achieved in that speech specimens input into a telephone terminal equipment are sampled in the telephone terminal equipment with a frequency that is doubled in comparison to the first frequency; in that the samples formed are transmitted from the telephone terminal equipment to the switching system in alternation in at least two useful data channels.

It must first be considered critical to the invention that a pre-processing of the speech specimens is already carried out in the telephone terminal equipment. The speech specimens themselves are not transmitted via the telephone network in analog form; on the contrary, they are already digitized in the telephone terminal equipment. They are thus not subject to any transmission-associated disturbing influences to which analog signals are subject.

It is also to be considered critical to the invention that twice the plurality of samples is formed with twice the sampling rate. Therewith, in particular, harmonic components of the voice signals that characterize the person-associated timbre are also made available at spatially remote speaker recognition means. Frequency components of the speech specimens in the range between 3 and 4.5 KHz are especially relevant for a reliable speaker recognition. The significant, speaker-associated third an fourth resonant location (format) of the vocal tract lie in this range. In male voices, the fourth format usually lies between 3 and 4 KHz and, in female voices, it usually lies between 3 and 4.5 KHz. Telephone lines usually allow a transmission of signals having a bandwidth of only 3.2 KHz. Despite this established limitation, the invention, however, allows a transmission of speaker-significant higher frequency harmonics above 3.2 KHz. In comparison to the prior art, the computation outlay is reduced given the same quality of speaker recognition; given the same computational requirement, a higher quality of speaker recognition is achieved.

In a further embodiment of the invention, information representing speaker-associated, alphanumerical characters are input within the framework of the speaker recognition test in addition to the speech specimens, whereby the reference speech specimens are selected with the information representing speaker-associated, alphanumeric characters for carrying out the comparison of the reference speech specimens and the speech specimens inputted in the framework of the speaker recognition test. When this comparison leads to a first signal that indicates a recognition of the appertaining speaker, an input of prescribed instructions into the switching system is enabled. The method of the invention can thus be employed in combination with further procedures that can be implemented dependent on a speaker recognition.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
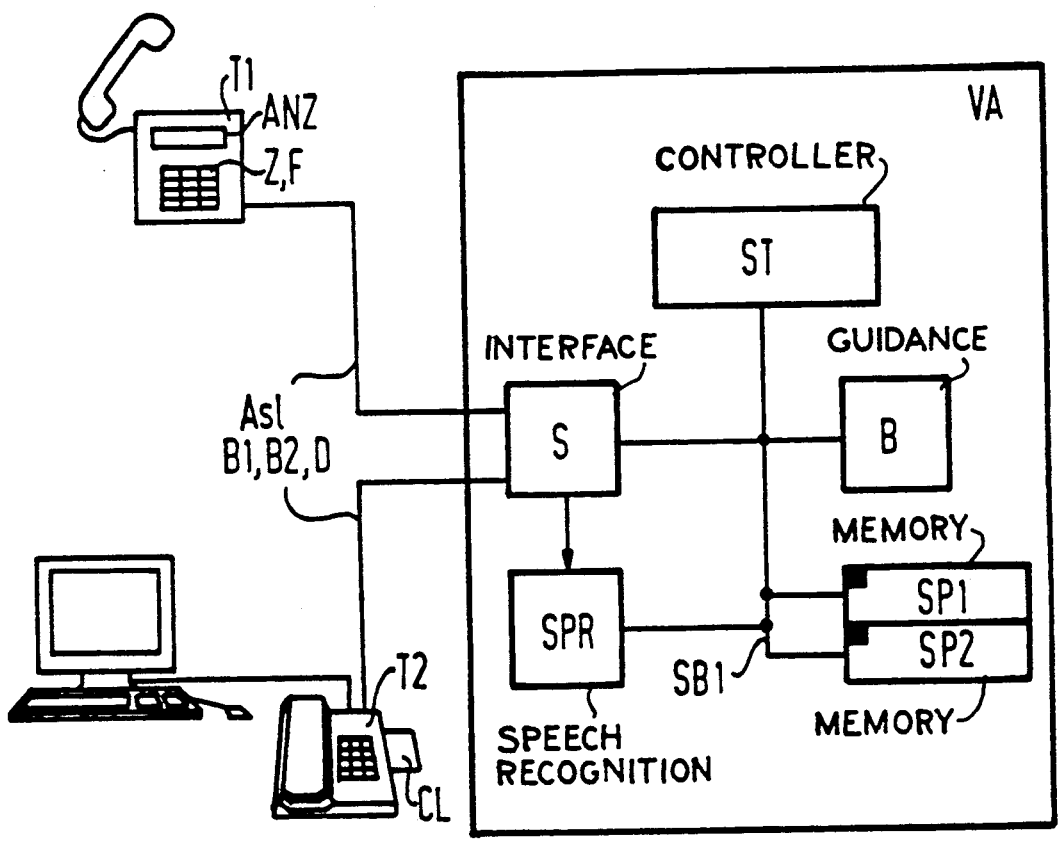
FIG. 1 is a block diagram of a system of the invention for speaker recognition composed of a telephone switching system having telephone terminal equipment.

The system for speaker recognition schematically shown in FIG. 1 is composed of a telephone switching system VA and of telephone terminal equipment T1, T2 connected thereto. The switching system VA, whereof only the parts serving for the actual speaker recognition are schematically shown, is composed of a programmable system controller ST that, via a first system bus SB1, has access to a peripheral interface S, to a speech recognition means SPR, to first and second memory areas SP1, SP2, and to an operator guidance means BF. The controller ST has a memory (not shown in the figure) allocated to it in which a program for system operations is deposited.

Commercially available components can be used as system components ST, SB1, S, SPR, SP1, SP2 and BF.

Telephone terminal equipment that, for example, are fashioned like the terminal equipment T1 and T2 shown in the figure can be connected to the interface S. For example, the telephone terminal equipment T1 comprises an optical display means ANZ. Selection numerals and signals that can be supplied by the interface S to the controller ST of the switching system VA can be generated with numeral keys Z and function keys F. For example, such signals indicate personal identifications of the respective system user and can assist the speaker recognition to be carried out in the switching system in such fashion that, in a comparison of speech specimens that are input into the system within the framework of a speaker recognition test and reference speech specimens already deposited in the system, the selection of these latter speech specimens occurs with the use of the personal identifiers. Instead of an input of person-identifying numerals with function keys F, it can also be provided that these numerals are stored on a chip card and are supplied to the system via a chip card reader CL, as symbolically shown in combination with the telephone terminal equipment T2.

The telephone terminal equipment T1 and T2 are connected to the switching system VA via central office lines As1. In particular, the switching system VA is fashioned as an ISDN-capable system (Integrated Services Digital Network). Information between the terminal equipment and the switching system are bi-directionally transmitted in at least one useful channel B and one signalling channel D. Insofar as the switching system VA is fashioned as an ISDN-capable communications private branch exchange, the interface S thereof shown in FIG. 1 also includes the function of a digital subscriber line module (SLMD) to which the telephone terminal equipment T1 and T2 are connected via SO interfaces that are not shown in FIG. 1. The switching system VA can also be fashioned as a public switching system.

Initiated by corresponding instructions of the controller ST, the known operator guidance means BF forms information that are communicated to the speakers to be recognized in a training phase serving for the formation of speaker-associated reference voice feature information and in the actual speaker recognition tests and the telephone terminal equipment T1, T2. The signalling can occur acoustically via the receiver earpiece or can occur optically with the optical display means ANZ. Included in the signalling information are the request to input speech specimens in the framework of the training phase or in the framework of a speaker recognition test, potentially texts that the speaker to be recognized is to repeat and also include the positive or negative result of a speaker recognition test. When this signalling occurs acoustically, then the means BF comprises a voice synthesizer means that vocally forms the respective information. Given a positive result of a speaker recognition test, the controller ST forms a first signal that indicates a recognition of the appertaining speaker or forms a second signal that indicates that the appertaining speaker was not recognized. Dependent on the results of the speaker recognition test, the appertaining speaker can have services made available to him or denied him. For example, such services are performance features in communications switching systems and services in the commercial area (banking transactions).

The switching system VA that is schematically shown only with respect to the components necessary for the speaker recognition carries out the speaker recognition in a known manner. In the invention, two useful channels B1 and B2 are used for communicating speech specimen information from the terminal equipment T1, T2 to the switching systems. The speaker recognition means SPR is supplied with double the number of speech specimen samples than is possible on the basis of the bandwidth of one transmission channel B1 or B2.

The memory areas SP1 and SP2 serve for the acceptance of information that are performed in conjunction with the speaker recognition. Further recognition of different speakers, speaker-associated speech features are first to be extracted from speech specimens in a training phase. The corresponding information are deposited in the first memory areas SP1 as reference information. The second memory areas SP2 serve for the acceptance of information that identifies speech features extracted in a speaker recognition test.

In the framework of a speaker recognition test, a speaker to be recognized can communicate a person-identifying information allocated only to him to the controller ST allocated in the switching system VA. This information serves for the selection of reference information in a comparison carried out within the framework of a speaker recognition test to the information that indicate the speech features extracted in the speaker recognition test. The information originally allocated to the speakers can be stored in the first memory areas SP1 in allocation to the speaker-associated reference information, whereas the person-identifying information communicated within the framework of a speaker recognition test are stored in the second memory areas SP2 in common with the speech feature information formed in the speaker recognition test.

Figure 2:
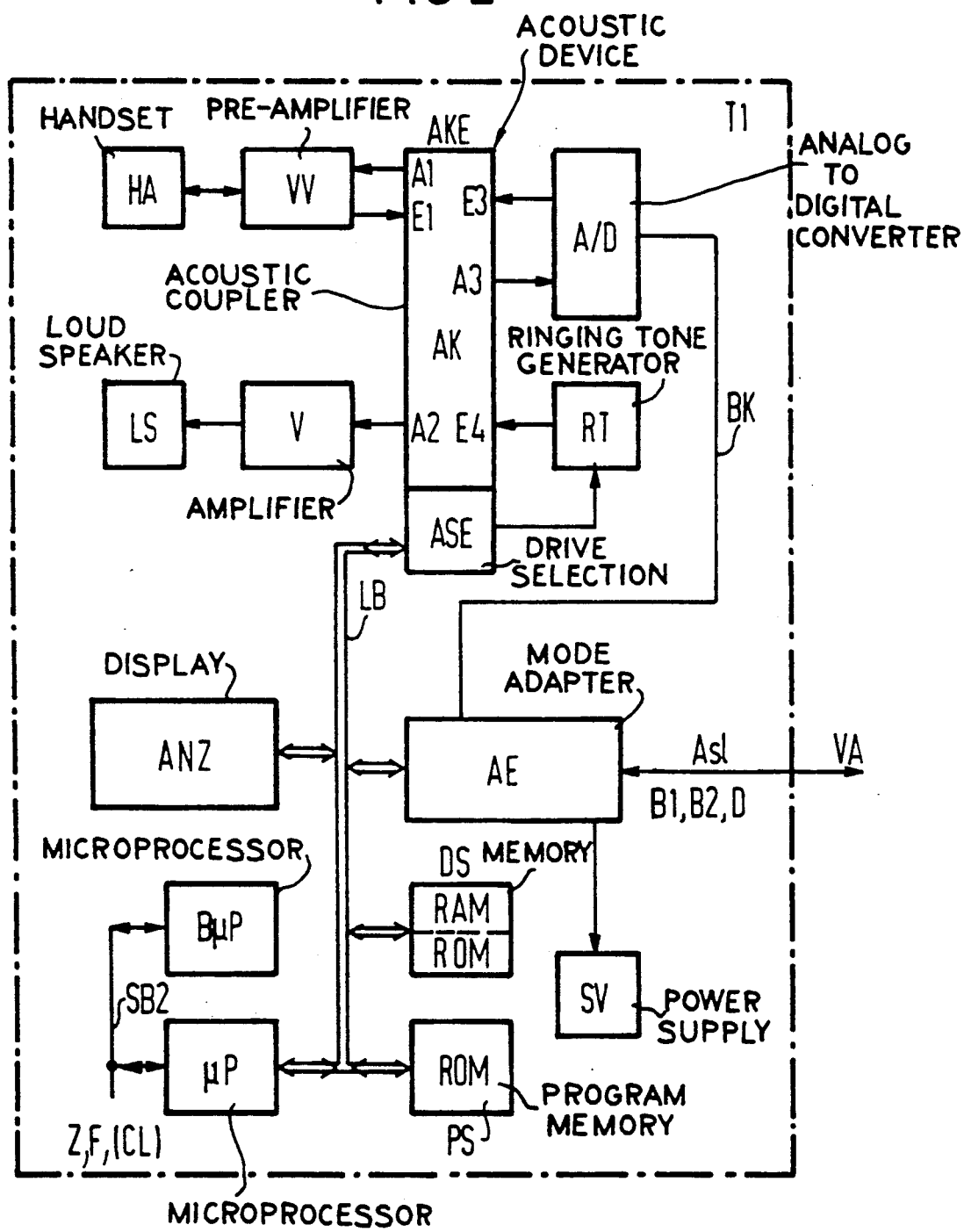
FIG. 2 is a schematic block circuit diagram of a telephone terminal equipment of FIG. 1.

FIG. 2 shows a block circuit diagram of a telephone terminal equipment T1 that forms a part of the system for speaker recognition of the invention. The central means for controlling the subscriber operator procedures, for controlling all acoustic signals to be communicated in the terminal equipment and for controlling the signalling with the switching system is realized with a microprocessor system $\mu P$. For example, this microprocessor system $\mu P$ can be formed with a Siemens microprocessor SAB 80 C 31. The microprocessor system $\mu P$, moreover, initiates the sampling of the speech specimens input into a telephone transmitter of a handset HA of the telephone terminal equipment T1, stores these in a buffer memory (DS RAM) and reads them out for transmission to the switching system VA. The microprocessor system $\mu P$ is connected to a program memory PS and to a data store DS via a local bus LB formed of control, address and data lines. The program memory PS realized in ROM memory technology, for example, is designed for a program encompassing a maximum of 64 kBytes. The one half, for example, of the data store DS that likewise encompasses, for example, 64 kBytes can contain a read-only memory executed in ROM memory technology for fixed data, parameter data and tables and the other half thereof can contain a memory executed in RAM memory technology for storing speech specimen samples and, as warranted, user-associated data. The microprocessor system $\mu P$ additionally comprises a serial bus interface that is not shown in FIG. 2. This serial bus interface is connected to a control panel microprocessor system $B\mu P$ via a serial bus SB2. The serial bus SB2 is also connected to the numerical keys Z, to the function keys F, and potentially, to a chip card reader (CL in FIG. 1).

The coded information generated by the control elements Z, F and, potentially, CL are recognized in the control panel microprocessor system $B\mu P$, are serially transmitted via the serial bus SB2 to the microprocessor system $\mu P$ and are further-processed in the latter to form signalling information and to form local operator guidance information that are preferably presented as optical displays on appropriate display means ANZ.

The display means ANZ connected to a local bus LB is realized, for example, with an LCD display (two lines of 24 characters each).

The telephone terminal equipment is connected to the subscriber line As1 via a mode adaptor or connector means AE. The telephone terminal equipment communicates via this subscriber line As with the appertaining switching system VA that comprises a central controller for the execution of the actual switching events and comprises the specific controller ST allocated to it that serves further realization of the procedures in conjunction with the speaker recognition.

For example, useful information comprising 64 kBytes/s are bi-directionally transmitted via the subscriber line As1 in a useful information channel B and signalling information encompassing 16 kBytes are bidirectionally communicated via the subscriber line As1 in a signalling information channel D. The signalling information communicated in the signalling information channel D are structured according to the OSI reference model. Of the seven, abstracted protocol layers of the OSI reference model, the lower three protocol layers are realized. The protocol layers utilized for the communications terminal equipment-to-communications system signalling are defined as bit transmission layer (layer 1), as protection layer (layer 2) and as switching layer (layer 3). The bit transmission layer, also referred to as physical level, handles the communication of the information in the useful information channel and in the signalling channel B, D simultaneously in both directions. This includes the activation, deactivation and operating of the telephone terminal equipment. For the following switching layer, the protection layer assumes the protected transmission of the signalling information between the switching system and the terminal equipment. For example, this can ensue with an HDLC switching procedure or with a last-look procedure. What is to be understood by last-look procedure is a repeated transmission of the information that must be recognized as identical in the reception means at least twice in succession and must also be different from the most recently received, valid signalling information in order to be recognized as valid. The switching layer serves for the set-up, monitoring and clear-down of the communications connections as well as for the control and monitoring of the performance features assisted by the switching system VA. It is essentially the functions of the bit transmission layer (layer 1) that are realized in the line unit under the control of the microprocessor system $\mu P$. The following, essential functions are contained in the mode adaptor AE:

Transmission-oriented matching to the subscriber line As1;

Communicating the signalling and useful information with signals formed according to a burst mode transmission method;

Separating useful information and signalling information and forwarding to the appropriate means; and Coupling electrical energy out that is transmitted via the subscriber line As1 and is offered by the switching system VA and forwarding this electrical energy to an internal telephone terminal equipment supply SV.

The electrical energy forwarded by the line unit AE is converted into a positive and negative feed voltage in the power supply SV that is required for the operation of the telephone terminal equipment. This power supply SV is preferably realized with a space-saving switched controller power supply.

The signalling information separated in the line unit AE from the information communicated via the subscriber line As1 are edited suited to the local bus and are communicated to the microprocessor system $\mu P$ via the local bus LB. In accord with the functions allocated to the protection layer and to the switching laser, these signalling information are further-processed in the microprocessor system $\mu P$ and the corresponding reactions are initiated, for example, selecting output units.

The useful information separated in the line unit AE proceed via a bus BK to an analog-to-digital converter means A/D. Analog voice signals are formed in the latter from the digitized useful information signals output by the line unit AE that represent voice signals. The analog voice signals incoming at a further input of the analog-to-converter means A/D are converted into digital voice signals. The coding or, respectively, decoding of the analog or, respectively, digital voice signals ensues with the known, standardized PCM method. The analog voice signals proceed via an appropriate connection to a third input E3 of an acoustic means AKE. The acoustic means AKE is composed of an acoustic coupler AK and of a drive or selection means ASE.

The analog signals incoming from the analog-to-digital converter means A/D are communicated either only to a first output A1 or to a first and second output A1, A2 by the acoustic coupler AK. Output A1 is connected to the handset of the telephone terminal equipment via a pre-amplifier VV. After the through-connection of the connection, the analog voice signals are conducted via the pre-amplifier VV to a receiver earpiece arranged in the handset HA in every case. Analogously thereto, the voice signals output by the telephone transmitter arranged in the handset HA proceed via the pre-amplifier VV to a first input E1 of the acoustic coupler AK.

The acoustic coupler AK switches the analog voice signals to a third output A3 connected to the analog-to-digital convertor means A/D. These analog voice signals are converted into digital signals in the analog-to-digital convertor means A/D and are inserted in the line unit AE into the useful information stream transmitted to the subscriber line As1. When the performance feature "Open Listening" is activated in the telephone terminal equipment by, for example, an appropriate key stimulus, then the analog voice signals incoming at the third input E3 are simultaneously conducted to a second output A2 of the acoustic coupler AK. From there, the analog voice signals proceed via an amplifier V to a loudspeaker LS arranged in the telephone terminal equipment.

The selection means ASE arranged in the acoustic means AKE is connected both to the acoustic coupler AK as well as to the local bus LB. In this selection means ASE, the control instructions communicated from the microprocessor system $\mu P$ via the local bus LB are converted into information with which the connecting circuits are set in the acoustic coupler AK. In addition, the selection means ASE controls a ringing tone generator RT that generates different meaning tones with corresponding ringing rhythms depending on the selection. These ringing tones are communicated to the handset HA and/or to the loud speaker LS via the acoustic coupler AK under the control of the selection means ASE.

A speaker recognition test can be initiated within the framework of the method of the invention by an instruction input into a terminal equipment T1, T2 with the selection keys Z, with the function keys F or with the chip card reader CL, this instruction being supplied to the controller ST of the switching system VA. The controller ST enables the input of speech specimens into the handset HA of the appertaining terminal equipment T1, T2. The enable is acoustically and/or optically signaled at the terminal equipment T1, T2. To this end, the means BF arranged in the switching system VA—initiated by a corresponding instruction of the controller ST (FIG. 1)—form signalling information that are supplied to the microprocessor system $\mu P$ of the terminal equipment T1 or, respectively, T2. Initiated by these signaling information, the microprocessor system $\mu P$ forwards an instruction to the analog-to-digital convertor means A/D that thus increases the otherwise standard sampling rate (first frequency) of 8 KHz to, in particular, 16 KHz.

The speech specimens then input into the microphone of the handset HA are sampled by a means A/D with 16 KHz after pre-amplification (VV). Initiated by the aforementioned signalling information communicated from the means BF, the line unit AE occupies both useful data or data information channels B1 and B2. The samples formed are inventively supplied to the switching system VA via the line unit AE alternately in channels B1 and B2. Potentially after an intermediate storage, the controller ST conducts the samples via the interface S to the speaker recognition means SPR that thus has twice the number of speech specimen samples available for the actual speaker recognition.

The speech specimen samples that are communicated chronologically first on the channels B1 and B2 are each preceded by a synchronization bit in the telephone terminal equipment by the microprocessor system $\mu P$ in collaboration with the line unit AE. The controller ST recognizes the time between the appearance of both synchronization bits, intermediately stores the samples received in alternation via the channels B1 and B2, for example in the second memory areas SP2, and reads the stored values out in succession for the actual speaker recognition, reading them out minus the time difference that has been identified. The samples that are read out are now supplied to the speech recognition means SPR.

Person-identifying information that may be potentially provided by the speakers to be recognized within the framework of a speaker recognition test are formed by actuation of the selection keys Z, of the function keys F or by introducing a chip card into a chip card reader CL. These information are recognized by the control panel microprocessor system $B\mu P$, are serially transmitted via the serial bus SB2 to the microprocessor system $\mu P$ and are further-processed there to form signalling information. Subsequently, the signalling information are transmitted by via the local bus LB, via the line unit AE and via the subscriber line ASL to the switching system VA in the signalling information channel D. The controller ST preferably intermediately stores the person-identifying information in the second memory areas SP2 and calls them in from the memory areas SP2 for carrying out the comparison of reference speech specimens with speech specimens formed within the framework of the speaker recognition test.

Figure 3:
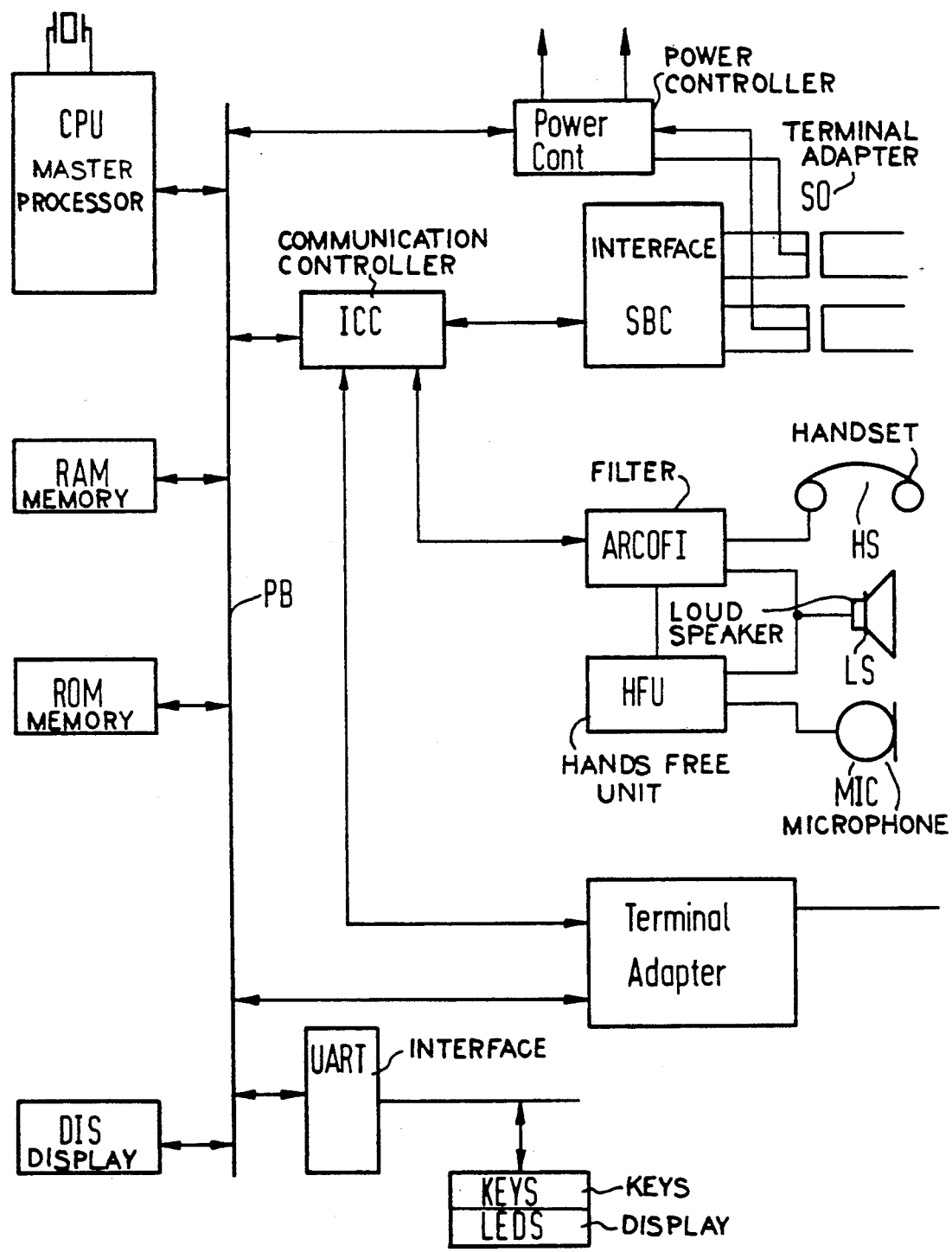
FIG. 3 is a block diagram of telephone terminal equipment of FIG. 1 realized with commercially available components.

FIG. 3 shows an ISDN telephone terminal equipment whose control-oriented components are essentially composed of standardized, integrated circuits. A master processor CPU—realized by the processor 80C133 of the Intel Company, that is, clocked with 2 Megahertz, as well as memory RAM, ROM and a display control DIS are connected to an 8 bit parallel bus PB. The essential protocol assemblies are formed by an ISDN communication controller ICC, a S-bus interface circuit SBC as well as by a terminal adaptor SO for the ISDN protocol RS 232. For example, the ISDN communication controller ICC can be formed by the integrated circuit PEB 2070 of Siemens AG, the S-bus interface circuit SBC can be realized by the integrated circuit PEB 20 80 of Siemens AG. The connection of the handset HS, of the loudspeaker LS and of the microphone MIC ensues via an Audio Ringing Codec Filter ARCOFI that can be realized with the integrated circuit PSB 2160 of Siemens AG, as well as via the "Hands Free" unit HFU that is realized with the integrated circuit PSB 45030 of Siemens AG. The connection of KEYS and of display means LEDS ensues via a serial interface UART that represents a universal asynchronous receiver transmitter that can be realized by the module AY-5-10 32 of General Instruments. A power controller line card (POWER CONT) that can be realized by the integrated module Am 7938 of Advanced Micro Devices is utilized as driver stage for the S-interface.

The inventive handling of the speech specimens provided by an operator ensues essentially within the ISDN communication controller ICC on the basis of corresponding programming.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for recognition of a speaker in a telephone switching system, wherein, in the framework of a speaker recognition test, speech specimens are input into telephone terminal equipment connected to the telephone switching system and are supplied to the switching system, whereby the speech specimens are sampled and the samples formed are supplied to a means for system control arranged in the switching system that, by comparing reference speech specimens originally deposited in the switching system and speech specimens input within the framework of the speaker recognition test, forms a first signal that indicates a recognition of the speaker or forms a second signal that indicates that the speaker was not recognized, comprising the steps of: the speech specimens input into the telephone terminal equipment being sampled in the telephone terminal equipment with a frequency that corresponds to a sampling rate doubled in comparison to a transmission rate; coding the sampled speech specimens to produce a plurality of coded representation signals of the sampled speech specimens; and the coded representation signals formed being transmitted from the telephone terminal equipment to the switching system in alternation in at least two data channels such that in a sequence of coded representation signals first, third, fifth, ... coded representation signals are transmitted in one of the two data channels and second, fourth, sixth ... coded representation signals are transmitted in the other of the two data channels.

2. The method according to claim 1, wherein a time difference between the first coded representation signal of the plurality of coded representation signals arriving via the one data channel and the second coded representation signal of the plurality of coded representation signals arriving via the other data channel is identified in the switching system; and wherein the plurality of coded representation signals are intermediately stored in a memory in the switching system, are successively read out of this memory minus the time difference and are supplied to a means for speaker recognition.

3. The method according to claim 1, wherein in the framework of the speaker recognition test, information representing speaker-associated alphanumerical characters is input in addition to the speech specimens; and wherein, for the implementation of the comparison of the reference speech specimens and the speech specimens inputted in the framework of the speaker recognition test, the reference speech specimens are selected with the information representing speaker-associated alphanumerical characters; and wherein an input of prescribed instructions into the switching system is enabled with said first signal.

4. An arrangement for the implementation of a method for recognition of a speaker in a telephone switching system, the speaker providing speech specimens to the telephone switching system, the arrangement comprising:
a programmable system controller having access via a system bus to,
a means for speaker recognition connected to said system bus,
first and second memory areas connected to said system bus, said first memory area storing reference speech specimens and said second memory area storing the speech specimens of the speaker,
a means for acoustic and/or optical operator guidance connected to said system bus for communicating information to the speaker, and at least one interface with which telephone terminal equipment in an ISDN communications network is connected, said telephone terminal equipment having a means for sampling speech specimens and a means for occupying at least two data channels, said interface connected to said system bus.

5. A method for recognition of a speaker in a telephone switching system, comprising the steps of: in the framework of a speaker recognition test, inputting speech specimens into telephone terminal equipment connected to the telephone switching system and supplying the speech specimens to the switching system; sampling the speech specimens and supplying the samples formed to a means for system control arranged in the switching system; by comparing reference speech specimens originally deposited in the switching system and speech specimens input within the framework of the speaker recognition test, forming a first signal that indicates a recognition of the speaker or a second signal that indicates that the speaker was not recognized; the speech specimens input into the telephone terminal equipment being sampled in the telephone terminal equipment with a frequency that corresponds to a sampling rate doubled in comparison to a transmission rate; coding the sampled speech specimens to produce a plurality of coded representation signals of the sampled speech specimens; and the coded representation signals formed being transmitted from the telephone terminal equipment to the switching system in alternation in at least two data channels such that in a sequence of coded representation signals first, third, fifth, ... coded representation signals are transmitted in one of the two data channels and second, fourth, sixth ... coded representation signals are transmitted in the other of the two data channels.

6. The method according to claim 5, wherein a time difference between the first coded representation signal of the plurality of coded representation signals arriving via the one data channel and the second coded representation signal of the plurality of coded representation signals arriving via the other data channel is identified in the switching system; and wherein the plurality of coded representation signals are intermediately stored in a memory in the switching system, are successively read out of this memory minus the time difference and are supplied to a means for speaker recognition.

7. The method according to claim 5, wherein in the framework of the speaker recognition test, information representing speaker-associated alphanumerical characters is input in addition to the speech specimens; and wherein, for the implementation of the comparison of the reference speech specimens and the speech specimens inputted in the framework of the speaker recognition test, the reference speech specimens are selected with the information representing speaker-associated alphanumerical characters; and wherein an input of prescribed instructions into the switching system is enabled with said first signal.

8. An arrangement for implementation of a method for recognition of a speaker providing speech specimens to the telephone switching system, comprising:
means for system control connected to a system bus;
means for speaker recognition connected to said system bus,
first and second means for providing memory areas connected to said system bus;
means for operator guidance connected to said system bus for communicating information to the speaker;
at least one interface connected to said system bus, said interface also connected to telephone terminal equipment via means for providing at least two data channels, said telephone terminal equipment having means for sampling speech specimens of the speaker which are input to the telephone terminal equipment;

wherein, in the framework of a speaker recognition test in the means for speaker recognition, the means for system control, by comparing reference speech specimens originally deposited in the first means for providing memory areas and speech specimens input within the framework of the speaker recognition test to the second means for providing memory areas, forms a first signal that indicates a recognition of the speaker or forms a second signal that indicates that the speaker was not recognized, the speech specimens input into the telephone terminal equipment being sampled in the telephone terminal equipment with a frequency that corresponds to a sampling rate doubled in comparison to a transmission rate; coding the sampled speech specimens to produce a plurality of coded representation signals of the sampled speech specimens and the coded representation signals formed being transmitted from the telephone terminal equipment to the switching system in alternation in the two data channels such that in a sequence of coded representation signals first, third, fifth, . . . coded representation signals are transmitted in one of the two data channels and second, fourth, sixth . . . coded representation signals are transmitted in the other of the two data channels.

9. The arrangement according to claim 8, wherein a time difference between the first coded representation signal of the plurality of coded representation signals arriving via the one data channel and the second coded representation signal of the plurality of coded representation signals arriving via the other data channel is identified in the switching system; and wherein the plurality of coded representation signals are intermediately stored in the second means for providing memory areas in the switching system, are successively read out of the second means for providing memory areas minus the time difference and are supplied to the means for speaker recognition.

10. The method according to claim 8, wherein in the framework of the speaker recognition test, information representing speaker-associated alphanumerical characters is input in addition to the speech specimens; and wherein, for the implementation of the comparison of the reference speech specimens and the speech specimens inputted in the framework of the speaker recognition test, the reference speech specimens are selected with the information representing speaker-associated alphanumerical characters; and wherein an input of prescribed instructions into the switching system is enabled with said first signal.

* * * * *